(12) United States Patent
Quix et al.

(10) Patent No.: US 8,733,102 B2
(45) Date of Patent: May 27, 2014

(54) HIGH-PRESSURE EXHAUST-GAS RECIRCULATION SYSTEM WITH HEAT RECOVERY

(75) Inventors: Hans Guenter Quix, Herzogenrath (DE); Christian Winge Vigild, Aldenhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 388 days.

(21) Appl. No.: 13/195,764

(22) Filed: Aug. 1, 2011

(65) Prior Publication Data

US 2012/0036848 A1 Feb. 16, 2012

(30) Foreign Application Priority Data

Aug. 11, 2010 (DE) .......... 10 2010 036 946

(51) Int. Cl.
*F02B 33/44* (2006.01)
*F02M 25/07* (2006.01)
*F02B 37/18* (2006.01)
*F02D 21/08* (2006.01)
*F02D 41/00* (2006.01)
*F02D 41/06* (2006.01)

(52) U.S. Cl.
CPC .............. *F02B 37/18* (2013.01); *F02D 21/08* (2013.01); *F02D 41/0065* (2013.01); *F02D 41/068* (2013.01); *F02M 25/0707* (2013.01); *F02M 25/0719* (2013.01); *F02M 25/0731* (2013.01); *F02M 25/0735* (2013.01); *F02M 25/0737* (2013.01); *F02M 25/0738* (2013.01); *F02M 25/0751* (2013.01); *F02M 25/0754* (2013.01); *Y02T 10/16* (2013.01); *Y02T 10/144* (2013.01); *Y02T 10/47* (2013.01)

USPC ................ 60/605.2; 123/568.12; 123/568.11

(58) Field of Classification Search
CPC .......... F02M 25/0707; F02M 25/0719; F02M 25/0737; F02M 25/0738; F02M 25/0735; F02M 25/0754; F02M 25/0751; F02M 25/0731; F02B 37/18; F02D 21/08; F02D 41/0065; F02D 41/068; Y02T 10/16; Y02T 10/144; Y02T 10/47
USPC ............ 60/605.2; 123/568.12, 568.11, 41.02; 701/108
IPC ....................................... F02M 25/07
See application file for complete search history.

(56) References Cited

U.S. PATENT DOCUMENTS

| 6,003,315 | A | 12/1999 | Bailey | 60/605.2 |
| 6,038,860 | A | 3/2000 | Bailey | 60/605.2 |
| 6,917,873 | B2 * | 7/2005 | Itoyama | 701/108 |
| 6,945,236 | B2 | 9/2005 | Nakai et al. | 60/605.2 |

(Continued)

FOREIGN PATENT DOCUMENTS

WO 2009/022113 A1 2/2009 ................... 60/605.2

*Primary Examiner* — Thai Ba Trieu
(74) *Attorney, Agent, or Firm* — Julia Voutyras; Alleman Hall McCoy Russell & Tuttle LLP

(57) ABSTRACT

A method for operation of a high pressure exhaust-gas recirculation (EGR) system is provided. The method includes transferring heat from an exhaust flow through an EGR cooler to an engine coolant, the EGR cooler coupled to an EGR line fluidly coupled in parallel with a turbine and directing a controlled portion of the exhaust flow from the EGR cooler to an engine intake. The method further includes directing another controlled portion of the exhaust flow from the EGR cooler to the surrounding atmosphere.

13 Claims, 3 Drawing Sheets

(56) References Cited

U.S. PATENT DOCUMENTS

| | | | |
|---|---|---|---|
| 7,107,761 B2* | 9/2006 | Fukuma et al. | 123/568.11 |
| 7,210,468 B1* | 5/2007 | Saele | 60/605.2 |
| 7,210,469 B1* | 5/2007 | Saele | 60/605.2 |
| 7,243,495 B2* | 7/2007 | Whelan et al. | 60/605.2 |
| 7,267,084 B2* | 9/2007 | Lutze et al. | 123/41.02 |
| 7,281,529 B2* | 10/2007 | Lew et al. | 60/605.2 |
| 7,305,828 B2* | 12/2007 | Todoroki et al. | 60/605.2 |
| 7,305,976 B1* | 12/2007 | Clarke | 60/605.2 |
| 7,353,102 B2* | 4/2008 | Narita et al. | 701/102 |
| 7,444,804 B2 | 11/2008 | Hashizume | 60/178 |
| 8,028,522 B2* | 10/2011 | Irmler et al. | 60/605.2 |
| 2006/0157000 A1* | 7/2006 | Lutze et al. | 123/41.02 |
| 2007/0028901 A1* | 2/2007 | Watakabe et al. | 60/605.2 |
| 2007/0089716 A1* | 4/2007 | Saele | 60/605.2 |
| 2007/0089717 A1* | 4/2007 | Saele | 60/605.2 |
| 2009/0217660 A1 | 9/2009 | Ranini et al. | 60/605.2 |

* cited by examiner

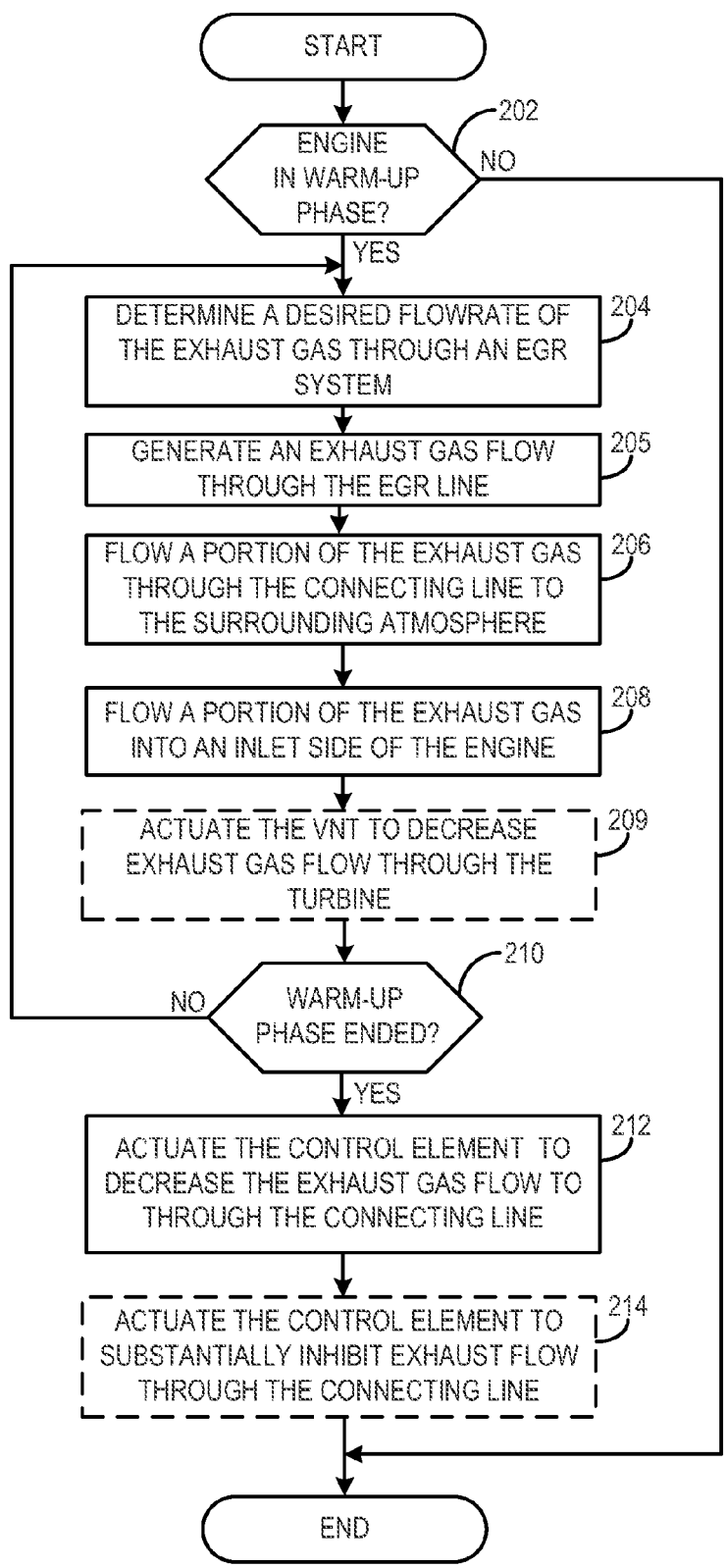

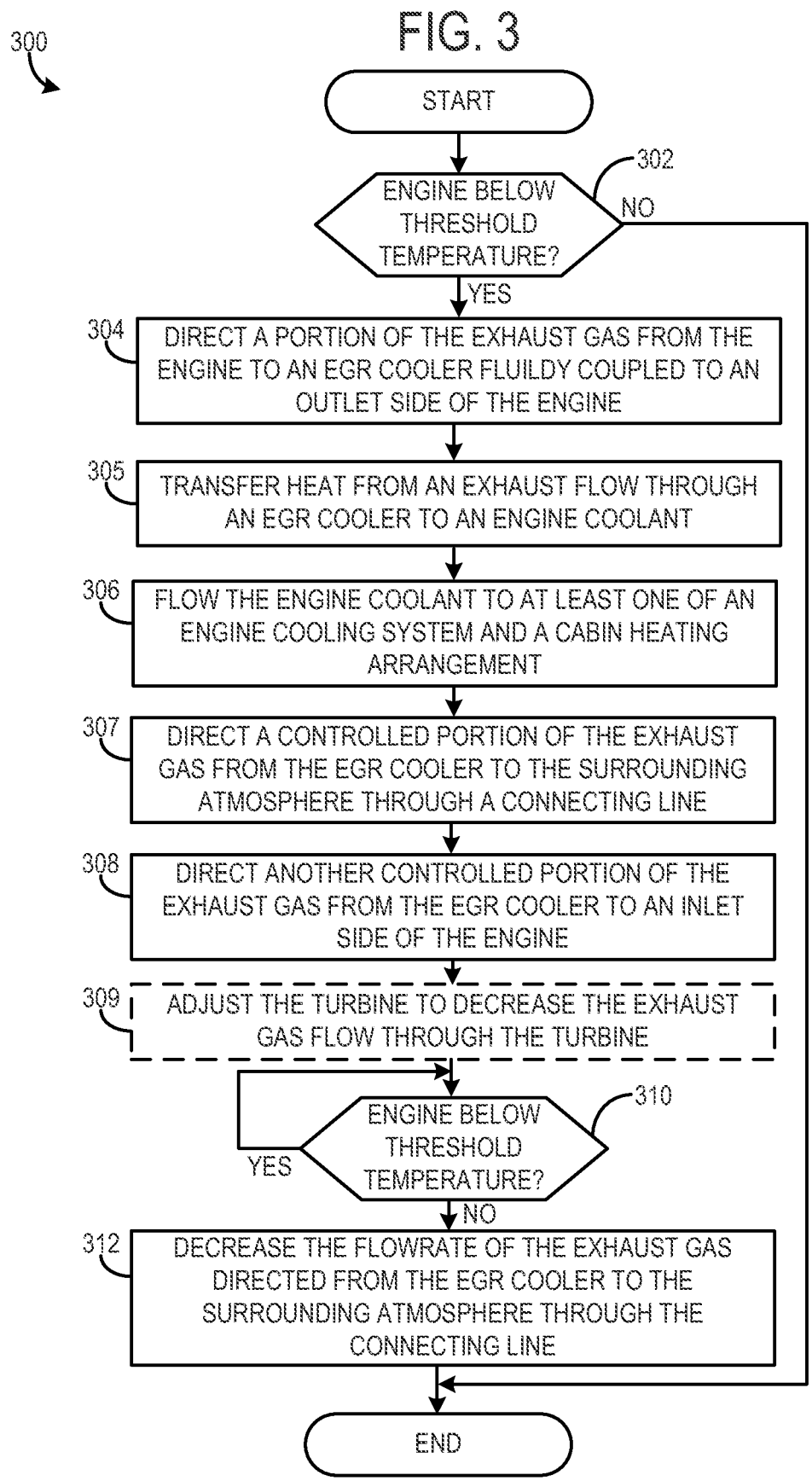

HIGH-PRESSURE EXHAUST-GAS RECIRCULATION SYSTEM WITH HEAT RECOVERY

CROSS-REFERENCE TO RELATED APPLICATIONS

This application claims priority to German Patent Application Number 102010036946.2, filed Aug. 11, 2010, the entire contents of which are hereby incorporated herein by reference for all purposes.

BACKGROUND

Exhaust-gas recirculation (EGR) systems are used in internal combustion engines to reduce the emissions of the internal combustion engine, for example with regard to nitrogen oxides. Cooling of the recirculated exhaust gases by means of the exhaust-gas cooler positioned in the EGR system further reduces the NOx emissions.

High pressure EGR systems have been developed to reduced emissions and increase combustion efficiency. In high-pressure EGR systems, exhaust gas to be recirculated is drawn from an exhaust line upstream of a turbine of the turbocharger and is supplied to the internal combustion engine at its inlet side. Exhaust-gas aftertreatment devices such as for example, a catalytic converter and/or a particle filter (diesel particle filter), may also be arranged in the exhaust line. In such an example, an EGR valve may be the component which, in interaction with a bypass valve, controls or affects an exhaust-gas recirculation rate through the EGR line. The exhaust gas flowed through the EGR system may be cooled via an EGR cooler positioned in an EGR line, before it enters the inlet side internal combustion engine. The EGR cooler reduces the exhaust-gas temperature and thereby increases the density of the exhaust gas. As a result of which the exhaust-gas recirculation cooler also contributes to an increased EGR rate. As a further result of the cooling of the hot exhaust gas to be recirculated, the temperature of the cylinder fresh charge is also reduced, that is to say the cooling of the exhaust gas contributes to improve charging of the combustion chamber with fresh air or fresh mixture.

However, the Inventors have recognized several drawbacks with the aforementioned EGR system. For example, after a cold start during the warm-up phase of the internal combustion engine, increasing the operating temperature of the internal combustion engine quickly may increase combustion efficiency as well reduce engine internal friction. Therefore, cooling of the exhaust gas in a high pressure EGR system may not be desired during a warm-up phase in the aforementioned EGR system as it would reduce intake charge temperature unnecessarily. Further, it may be desirable to reduce the emissions of unburned hydrocarbons and the emissions of carbon monoxide resulting from an incomplete combustion as a result of excessively low cylinder temperatures and increase the exhaust-gas temperature such that exhaust-gas aftertreatment systems arranged downstream of the cylinders in the exhaust-gas discharge system may reach its light-off temperature (e.g., operating temperature) more quickly. Therefore, the cooling of the exhaust gas during the recirculation is therefore prevented in the warm-up phase of the internal combustion engine described above to enable the exhaust-gas aftertreatment device to reach as desired operating temperature and to reduce engine emissions. For this purpose, the EGR apparatuses in some EGR systems may be provided with a bypass valve which enables the EGR cooler to be bypassed during the recirculation of the exhaust gas and which may be arranged upstream or downstream of the EGR valve in the exhaust-gas recirculation line.

WO 2009/022113 A1 discloses a high-pressure EGR system for in an engine, in which exhaust gas is extracted directly from an exhaust line upstream of a turbine of a turbocharger and is supplied via an EGR line to two exhaust-gas coolers connected in series. After exiting the second exhaust-gas cooler as viewed in the flow direction, the cooled exhaust gas is supplied to the inlet side of the internal combustion engine. The two exhaust-gas coolers are designed differently in terms of their cooling efficiency, such that the first exhaust-gas cooler has a lower cooling power than the second exhaust-gas cooler. The exhaust gases to be recirculated are thus cooled in a stepped fashion, to a required temperature level of the exhaust gases to be introduced into the intake-air line. WO 2009/022113 A1 also discloses a method in which recirculated exhaust gas is inhibited from flowing through the second exhaust-gas cooler in a warm-up phase of the internal combustion engine.

Furthermore, many modern internal combustion engines generate relatively little heat, which on the one hand is extremely positive with regard to thermal loading, but which secondly is disadvantageous with regard to the warm-up phase of the internal combustion engine, because this can lead to increased friction within the engine during the warm-up phase. Furthermore, auxiliary heating devices may be needed, for example, in order to meet the requirements of a cabin heating arrangement.

Some internal combustion engines may be configured to recover the heat energy of the exhaust gases of the internal combustion engine in order thereby for example to shorten the warm-up phase of the internal combustion engine, wherein exhaust gases are conducted through a separate exhaust-gas heat exchanger which is arranged, for example, in an exhaust line downstream of the exhaust-gas aftertreatment devices. In this way, the heat of the exhaust gases may be transferred to the heat exchanger medium circulating in the heat exchanger. The heat exchanger medium may be coolant of the internal combustion engine, such that in this way the warm-up phase of the internal combustion engine can be influenced by a warming thereof via the relatively warm cooling medium. The heated coolant may also be flowed to a cabin heating arrangement, enabling heating of the cabin during warm-up.

Both of the aforementioned systems, that is to say the exhaust-gas recirculation system and the heat recovery system, are provided separately from one another and, with their components, require a considerable amount of installation space, which is available only to a restricted extent in or on motor vehicles.

SUMMARY

A method for operation of a high pressure exhaust-gas recirculation (EGR) system is provided. The method includes transferring heat from an exhaust flow through an EGR cooler to an engine coolant, the EGR cooler coupled to an EGR line fluidly coupled in parallel with a turbine and directing a controlled portion of the exhaust flow from the EGR cooler to an engine intake. The method further includes directing another controlled portion of the exhaust flow from the EGR cooler to the exhaust system.

In this way, heat may be supplied to the engine via an EGR cooler during a warm-up phase in the engine, while selectively flowing a portion of the exhaust gas to the exhaust system. Thus, heat may be extracted from the EGR system while at least a portion of the exhaust gas flowing through the EGR system is directed to the exhaust system. This method is particularly beneficial during warm-up when the engine is below a threshold temperature when exhaust gas recirculation to the engine inlet side may not be needed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIG. 2 shows a method for operation of a high-pressure EGR system.

FIG. 3 shows another method for operation of a high pressure EGR system.

DETAILED DESCRIPTION

Figure 1:
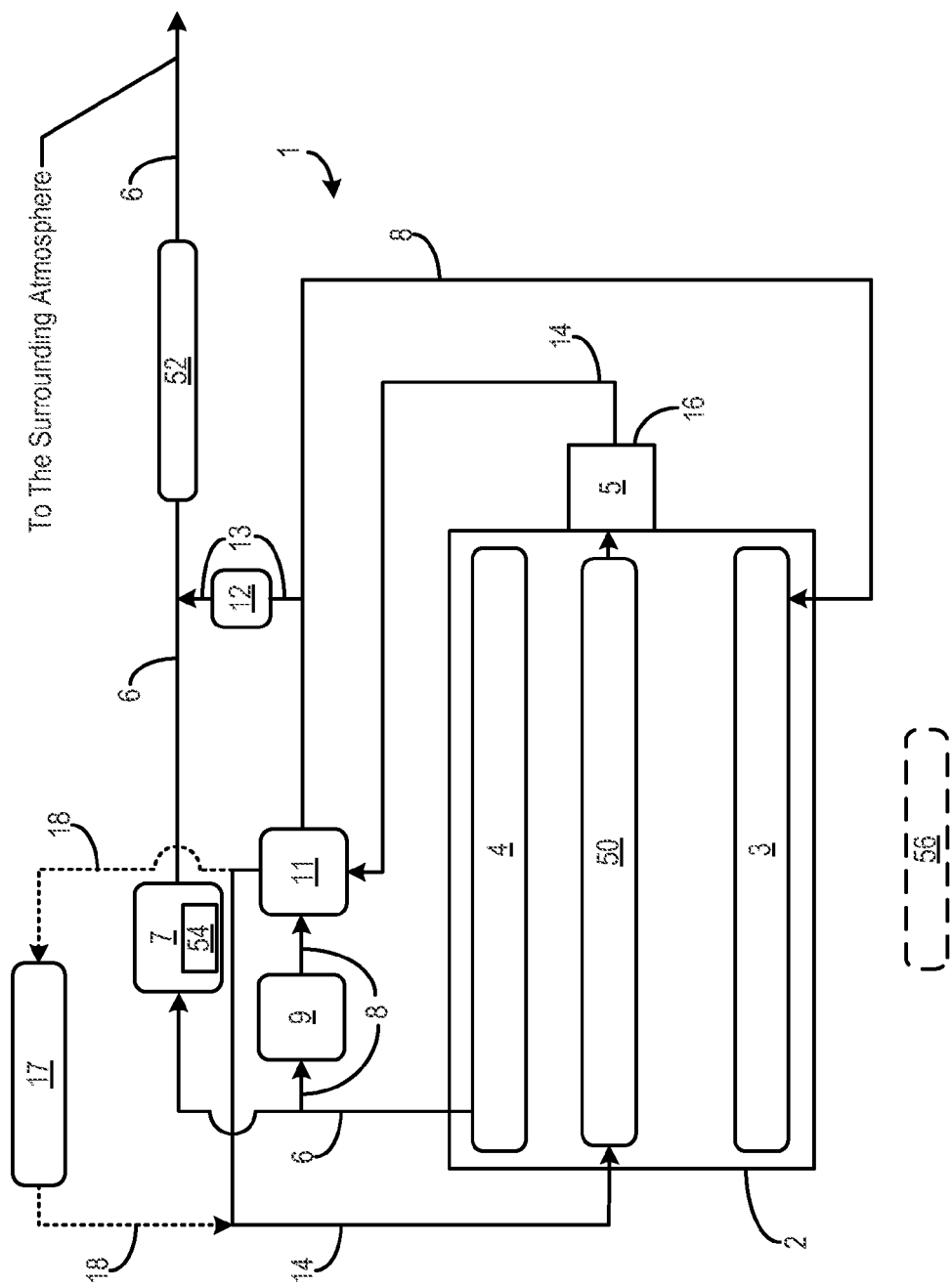
FIG. 1 shows a schematic illustration of a high-pressure exhaust-gas recirculation system for an internal combustion engine.

A high-pressure exhaust-gas recirculation (EGR) system and method for controlling said high-pressure EGR system is disclosed herein. It will be appreciated that a high pressure EGR system as defined herein is an EGR system for an engine that draws exhaust gas for recirculation at a location upstream of a turbine. On the other hand, a low pressure EGR system is an EGR system for an engine that draws exhaust gas for recirculation at a location downstream of a turbine. The high-pressure EGR system may be configured such that components, such as an EGR cooler, can serve a dual use. For example, the EGR cooler may be used to provide cooling to recirculated exhaust gas when the engine is operating above a threshold temperature as well as provide cooling to exhaust gas flowed to the surrounding atmosphere. The EGR cooler may provide coolant to the engine and/or cabin heating arrangement during the warm-up. In this way, the EGR cooler can be used to provide cooling to the EGR gas as well as provide heated coolant to the engine during warm-up. As a result, a reduced installation space can be attained in the engine or vehicle via the dual use component(s). In other words, the compactness of the EGR system may be increased.

Specifically, in one example a high-pressure EGR system is provided. The EGR system may include a connecting line in which a control element arranged. The connecting line may branch off from an EGR line downstream of an EGR cooler and opens out in the exhaust line. Furthermore, the EGR cooler may be incorporated in a cooling system of the internal combustion engine such that exhaust gases flowing through the EGR line can be cooled by means of the EGR cooler in a warm-up phase of the internal combustion engine and the exhaust gas from the EGR cooler can at least partially be flowed into the exhaust line. In this way, the high pressure EGR system can adjust the amount of exhaust gas that is recirculated and flow a portion of the exhaust gas to the exhaust system while at the same time recovering heat from the exhaust gas.

Additionally, the EGR cooler may be coupled to a cooling system of the internal combustion engine such that coolant, heated by the exhaust gas, may be flowed therebetween. In this way, heat may be transferred from the EGR cooler to the engine cooling system, enabling the engine temperature to be increased more rapidly during a warm-up.

Additionally, a connecting line, including a control element disposed therein, is fluidly coupled to the EGR line and the exhaust line downstream of a turbine. The control element and an EGR valve positioned in the EGR line may be operated to flow at least a portion of the exhaust gas in the EGR line to the exhaust system. In other words, with corresponding actuation of the exhaust-gas recirculation valve and of the control element, it is possible to allow exhaust gases to flow through the exhaust-gas recirculation line, and to utilize or recover the heat thereof, when exhaust-gas recirculation and/or cooling of the recirculated exhaust gases is not required or not desired, wherein the recirculated exhaust gases can flow entirely or partially via the connecting line in the direction of the exhaust line. Compared to the heat recovery system in previous engines, which is conventionally arranged downstream of the exhaust-gas aftertreatment devices, only one additional connecting line with a control element may be needed in the high-pressure EGR system described herein.

When the connecting line branches off from the EGR line downstream of the EGR cooler and opens out in the exhaust line a clear advantage can be obtained with regard to the installation space for the EGR system because the EGR cooler has the dual function of an exhaust-gas cooler and of a heat exchanger for recovering heat from the exhaust gases, such that it may be in effect be possible to dispense with a separate heat exchanger in the exhaust line. Furthermore, the available exhaust-gas temperature may be higher because the exhaust gases flow directly through the EGR cooler without passing for example through the exhaust-gas aftertreatment devices, in which non-recoverable temperature losses occur. Since at least a partial amount of the exhaust gases flowing through the EGR line can be conducted (with corresponding actuation of the control element) via the connecting line into the exhaust line, higher exhaust-gas flow rates can also be obtained with the high-pressure EGR system described herein.

Furthermore, in some embodiments the EGR cooler may be connected, for example, to a heat exchanger arranged in the motor vehicle (e.g., a cabin heating arrangement). The heat recovered from the exhaust gases can thus be utilized not only to shorten the warm-up phase, that is to say to warm up the internal combustion engine in its warm-up phase, but also to adjust the cabin temperature.

Further in some embodiments, to attain a high gas mass flow, a variable nozzle turbine (VNT) in a turbocharger may be provided in the exhaust system. The VNT may be configured to adjust the aspect ratio in the turbine. Therefore, the VNT may be adjusted so that a desired amount of charger pressure in the turbocharger can be attained despite the branching-off of exhaust from the exhaust line. The aspect ratio of the turbine may be adjusted via the alteration of the position of the blades in the turbine.

Further in some embodiments, using suitable measures, for example by means of a calibration of the internal combustion engine, provision may be made for the exhaust-gas temperature of the internal combustion engine to be increased in order to be able to further increase the amount of heat recovered. This is because an increase in the exhaust-gas temperatures of exhaust gases which are conducted through the exhaust-gas recirculation system is not detrimental in particular in the warm-up phase because at least a partial amount of said exhaust gases can be conducted via the connecting line directly into the exhaust line, wherein the recovered heat can be provided for shortening the warm-up phase or for warming up the internal combustion engine, or else optionally to other heat exchangers, such as for example of a cabin heating arrangement.

Further in some embodiments, the EGR valve and/or the control element may be continuously adjustable and/or may be adjusted independently. The two components may however also have multi-stage adjustability or single-stage adjustability, in other embodiments. Further still in some embodiments the exhaust-gas recirculation valve (EGR valve) and/or the control element downstream of the exhaust-gas recirculation cooler can be electrically, hydraulically, pneumatically, mechanically or magnetically controlled, in a coordinatable manner and simultaneously, preferably by means of the engine controller of the internal combustion engine or a central control unit. Additionally, queries with regard to certain operating modes may be stored and/or executed in the control unit such as a controller including memory storing code executable via a processor.

The control unit may be configured to, in a first step for controlling the high-pressure exhaust-gas recirculation system, determine whether the internal combustion engine is in a warm-up phase, that is to say whether the internal combustion engine is started for example after a relatively long standstill period (cold start). If this is confirmed that the internal combustion engine is in a warm-up phase, the exhaust-gas rate which should flow through the recirculation system is determined in a second step by actuation of the exhaust-gas recirculation valve. In a third step, a control element arranged in the connecting line to the exhaust system is actuated such that at least a partial amount of the exhaust gases flowing through the exhaust-gas recirculation cooler is conducted through the connecting line in the direction of the exhaust line.

In some embodiments in a first phase of the warm-up phase that the substantially majority (as it were, recirculated) exhaust-gas flow is conducted in the direction of the exhaust line by corresponding actuation of the control element. If, in a further step executed after the first phase, it is detected that the internal combustion engine can be advantageously operated by means of an amount of recirculated exhaust gas, the control element can be actuated correspondingly and close the connecting line in a stepped or continuous manner such that cooled exhaust gases, or a partial amount thereof, can be conducted to the inlet side of the engine. If it is detected that the warm-up phase of the internal combustion engine has ended, that is to say the internal combustion engine has reached its operating temperature, the control element may be actuated such that the connecting line is fully closed. It is however also possible for the control element to be actuated so as to control the exhaust-gas recirculation rate in interaction with the exhaust-gas control valve when the internal combustion engine has reached its operating temperature, in some embodiments.

When the EGR system is operated in this way, it is advantageously possible for a bypass line including bypass valve, bypassing the cooler to be dispensed with because the tasks thereof can clearly be performed by the connecting line in interaction with the exhaust-gas recirculation valve and the control element. Further benefits can be realized if exhaust gases can continuously flow through the exhaust-gas recirculation cooler, that is to say in all operating modes of the internal combustion engine, in order thereby to recover the heat inherent in the exhaust gases. Here, the exhaust-gas recirculation rate can self-evidently be controlled through the interaction of the EGR valve with the control element.

As previously discussed the turbocharger may be formed with adjustable blades. The VNT may be controlled such that when exhaust gases flow through the exhaust-gas recirculation line despite the detection of the warm-up mode of the internal combustion engine, the turbine may be substantially closed in order thereby to obtain a desired amount of charge pressure, in some embodiments.

It will be appreciated that when the exhaust-gas temperature of the internal combustion engine is increased when exhaust gases (to be recirculated, as it were) flow through the exhaust-gas recirculation line in the warm-up phase.

FIG. 1 shows, a schematic illustration of a high-pressure exhaust-gas recirculation system 1 included in an internal combustion engine 2. In one embodiment the internal combustion engine 2 may use compression ignition for combustion operation. However, in other embodiments spark ignition may be used for combustion operation. Still further in other embodiments a hybrid engine using both spark and compression ignition may be utilized.

The internal combustion engine 2 may include an inlet side 3 and an exhaust-gas side 4. The inlet side 3 may be configured to supply the internal combustion engine with intake air. Likewise the exhaust-gas side 4 may be configured to receive exhaust gas from the engine 2. The engine 2 may further include a cooling system 50 configured to remove heat from the engine via the circulation of coolant in the engine 2 via coolant passages. In some embodiments, a thermostat 5 configured to adjust the coolant flow and therefore temperature of the engine 2 may be included in the cooling system 50.

An exhaust line 6 may be fluidly coupled to the exhaust-gas side 4. One or more exhaust gas after-treatment device(s) 52, such as a particulate filter, catalytic convertor, etc., may be arranged in the exhaust line 6. The internal combustion engine 2 may further include a turbocharger, of which only the turbine 7 is illustrated. It will be appreciated that the turbine 7 may be coupled to a compressor (not shown). The turbine 7 may include blades 54. The turbine 7 may be arranged in the exhaust line 6. In some embodiments the turbine 7 may be a variable nozzle turbine (VNT) configured to adjust the aspect ratio of the turbine. The aspect ratio of the turbine may be adjusted based on the operating conditions of the engine.

An exhaust-gas recirculation line 8, in which an EGR valve 9 may be positioned upstream of an EGR cooler 11. As depicted, the EGR line 8 may branch off of the exhaust line 6 upstream of the turbine 7. A connecting line 13 may branch off from the EGR line 8 downstream of the EGR cooler 11 and may open out in the exhaust line 6. Additionally, a control element 12 may be arranged in the connecting line 13. The control element 12 may be a valve or other suitable device configured to adjust the gas flow through connecting line 13. In this way, the EGR cooler 11 and the EGR valve 9 may be fluidly coupled in a parallel flow configuration with the turbine 7.

The EGR cooler 11 may be connected to the cooling system of the internal combustion engine. That is to say that coolant from the cooling system in the internal combustion engine 2 may be flowed through the EGR cooler 11. For this purpose, a medium line 14 may be provided. The medium line 14 may lead out of a thermostat housing 16 to the EGR cooler 11. In this way, the medium line 14 is fluidly coupled to the thermostat 5 and the EGR cooler 11. It will be appreciated that coolant from the cooling system may be flowed through the medium line 14. Another portion of the medium line may lead back to the cooling system 50 of the internal combustion engine 2. In this way, coolant may be flowed from the cooling system 50 to the thermostat 5, through the EGR cooler 11, and then back to the cooling system, thereby completing a coolant loop.

In some embodiments, the EGR cooler 11 may optionally be connected to a heat exchanger 17, such as a cabin heating arrangement, via heating arrangement line 18. Arrangement line 18 is illustrated by dashed lines to convey that it may or may not be included in the internal combustion engine 2. The heating arrangement line 18 may branch off medium line 14 and then reconnect to the medium line 14 at a location downstream of the initial branch point. In this way, coolant may be flowed from the medium line 14 to the heat exchanger 17.

The internal combustion engine may include a control system. The control system may include EGR valve 9, control element 12, and/or turbine 7. Each of the aforementioned components may be controlled via a controller 56 and/or may be controlled via electronic and/or mechanical parts integrated into the components. The controller 56 may include memory storing instructions executable via a processor.

It will be appreciated that during a warm-up phase when the engine is below a threshold temperature. The warm-up phase may occur after the internal combustion engine is not operated for an extended period of time and then started when the engine is below the threshold temperature. During warm-up recirculating exhaust gas into the inlet side of the engine and/or cooling the recirculated exhaust gas may increase combustion inefficiency and well as decrease the effectiveness of engine lubrication. Therefore, is may be desirable to flow at least a portion of the exhaust gas to the surrounding atmosphere.

Specifically in one approach the control system may be configured to, during a warm-up phase, flow at least a portion of the exhaust gas from the exhaust-gas side 4 of the internal combustion engine 2 to the EGR line 8, through the EGR cooler 11, through the connecting line 13, to the exhaust line 6, and then to the surrounding atmosphere. It will be appreciated that heat may be flowed from the exhaust gas to a coolant in the EGR cooler 11 during the aforementioned control strategy. The aforementioned step may be implemented via at least partially opening (i.e., permitting gas flow therethrough) the EGR valve 9 and the control element 12. It will be appreciated that when the control element is fully open the substantially majority of the exhaust gas flows to the exhaust line 6 and then the surrounding atmosphere because the pressure in the inlet side 3 of the engine is considerably higher than the pressure in the exhaust system. However, in other examples, a valve may be positioned in the EGR line 8 downstream of the EGR cooler 11 to substantially inhibit gas flow into the inlet side 3 of the internal combustion engine 2.

Additionally, the coolant from the EGR cooler 11 may then be directed to the internal combustion engine 2 in the control strategy. In this way, heat may be provided to the internal combustion engine 2 during the warm-up phase thereby shortening the warm-up phase. Additionally or alternatively, the coolant from the EGR cooler 11 may be directed to the heat exchanger 17 during the warm-up phase. In this way, cabin heating may be provided during warm-up.

If the internal combustion engine 2 is started after a relatively long standstill period (cold start) or if the internal combustion engine 2 is in its warm-up phase, EGR and/or cooling of recirculated exhaust gases may not be needed. Thus, a method of control may be implemented in which exhaust gases are flowed through the EGR line 8 and the EGR cooler 11 may be implemented. The EGR valve 9 may be control to facilitate the aforementioned operation. The method may further include flowing exhaust gas through connecting line 13 during the warm-up phase. In this way, at least a portion of the exhaust gas may be directed to the surrounding atmosphere via exhaust line 6 instead of into the inlet side 3 of the internal combustion engine 2. It will be appreciated that the amount of gas flow directed through the connecting line 13 during warm-up may be selected based on engine temperature, air-fuel ratio, and/or boost pressure in the engine. Control element 12 may be adjusted to implement the aforementioned operation. It will be appreciated that when the connecting line 13 is fully open, almost the entire, that is to say the recirculated, exhaust-gas flow is supplied via the connecting line 13 directly to the exhaust line 6, due to the pressure level in the exhaust system being considerably lower than the pressure in the inlet side 3.

As previously discussed, since the EGR cooler 11 is advantageously connected to the cooling system of the internal combustion engine 2, the EGR cooler 11 can function as a heat exchanger which absorbs the heat of the exhaust gases flowing through and transfers said heat to cooling medium. The recovered heat can thus be utilized to shorten the warm-up phase or warm-up the internal combustion engine 2. The recovered heat may optionally be provided to the heat exchanger 17.

The high-pressure EGR system 1, according to FIG. 1, incorporates both the function of EGR and secondly the function of heat recovery from exhaust gases into the system. Only the additional connecting line 13, which opens out in the exhaust line 6, and a single control element 12 arranged in the connecting line 13 may be needed for said dual use function. Furthermore in some embodiments, it may be possible to dispense with a conventional bypass valve upstream of the EGR cooler 11, because by means of corresponding actuation of the control element 12, a recirculation of cooled exhaust gases to the inlet side 3 of the internal combustion engine 2 can be prevented in certain operating modes in which a recirculation of cooled exhaust gases is not expedient. At the same time, the control element 12 in interaction with the EGR valve 9 can set a desired EGR rate in the respective operating states of the internal combustion engine 2 by virtue of the path to the connecting line 13 being correspondingly opened or closed by means of the control element 12. The EGR valve 9 and/or the control element 12 may be continuously adjustable or may be discretely adjustable (e.g., multi-stage adjustable) and/or may be independently adjusted. It will be appreciated, that when continuously adjustable valves and/or control elements are used the precision of the EGR flowrate through the EGR system may be increased.

Further in some embodiments, when the turbine 7 is a VNT, the turbine blades 54 in turbine 7 may be correspondingly adjusted in order to be able to attain a desired charge pressure when, despite the cold start or despite the warm-up phase of the internal combustion engine 2, exhaust gases are extracted from the exhaust line 6 and flow into the EGR line 8.

FIG. 2 shows a method 200 for operation of a high pressure EGR system. Method 200 may be implemented via the EGR system, engine, components, etc., described above with regard to FIG. 1 or alternatively may be implemented via another suitable EGR system, engine, components, etc.

Method 200 includes at 202 determining if the engine is in a warm-up phase. If it is determined that the engine is not in a warm-up phase (NO at 202) the method ends. The temperature of the engine may be used to determine if the engine is in a warm-up phase. Specifically, it may be determined if the engine is below a predetermined threshold warm-up temperature. On the other hand if it is determined that the engine is in a warm-up phase (YES at 202) the method proceeds to 204. At 204 the method includes determining a desired flowrate of the exhaust gas through an EGR system, the EGR system including an EGR line fluidly coupled to the exhaust gas side of the engine, an EGR cooler positioned in the EGR line and a connecting line fluidly coupling the EGR line to an exhaust line downstream of a turbine fluidly coupled to the exhaust gas side of the engine.

Next at 205 the method includes generating an exhaust gas flow through the EGR line via the actuation of an EGR valve. It will be appreciated, that the EGR valve may be positioned upstream of an EGR cooler in the EGR line.

Next at 206 the method includes flowing a portion of the exhaust gas through the connecting line to the surrounding atmosphere. A control element arranged in the connecting line may be actuated to implement step 206. Next at 208 the method includes flowing a portion of the exhaust gas into an inlet of the engine. In some embodiments, the entire exhaust gas flow may be flowed through the connecting line to the surrounding atmosphere. Thus, in the aforementioned embodiment step 208 may not be included.

When the turbine is a VNT, the method includes at step 209, actuating the VNT to decrease exhaust gas flow through the turbine. In some embodiments, the exhaust gas flow through the turbine may be substantially inhibited.

At 210 it is determined if the warm-up phase has ended. Specifically in some embodiments it may be determined if the engine temperature has surpassed a predetermined threshold value.

If it is determined that the warm-up phase has not ended (NO at 210) the method returns to 204. In other embodiments if it is determined that the warm-up phase has not ended (NO at 210) the method may return to 210. However, if it is determined that the warm-up phase had ended (YES at 210) the method proceeds to 212 where the method includes actuating the control element to decrease the exhaust gas flow to through the connecting line. It will be appreciated that when the exhaust gas flow through the connecting line is decreased, the exhaust gas flow from the EGR cooler to the inlet side of the engine is increased. At 214 the method may include in certain embodiments actuating the control element to substantially inhibit exhaust flow through the connecting line. After 214 the method ends.

FIG. 3 shows a method 300 for operation of a high pressure EGR system. Method 300 may be implemented via the EGR system, engine, components, etc., described above with regard to FIG. 1 or alternatively may be implemented via another suitable EGR system, engine, components, etc.

At 302 the method includes determining if the engine below threshold temperature. The threshold temperature may be a predetermined value. If it is determined that the engine is not below a threshold temperature (NO at 302) the method ends. However if it is determined that the engine is below a threshold temperature (YES at 302) the method proceeds to 304 where the method includes directing a portion of the exhaust gas from the engine to an EGR cooler fluidly coupled to an outlet side of the engine. Next at 305 the method includes transferring heat from an exhaust flow through an EGR cooler to an engine coolant. Next at 306 the method includes flowing the engine coolant to at least one of an engine cooling system and a cabin heating arrangement.

Next at 307 the method includes directing a controlled portion of the exhaust gas from the EGR cooler to the surrounding atmosphere through a connecting line. Next at 308 the method includes directing another controlled portion of the exhaust gas from the EGR cooler to an inlet side of the engine. In some embodiments the exhaust gas flowed from the EGR cooler to the surrounding atmosphere as well as the exhaust gas flowed from the EGR cooler to the inlet side of the engine comprise the total exhaust gas flow from the engine. Therefore, step 308 may include directing the remainder of the exhaust flow through a connecting line fluidly coupled to an exhaust line downstream of the turbine. However, in other embodiments, the aforementioned exhaust gas flows may only comprise a portion of the total exhaust gas flow from the engine.

Next at 309, the method may include, adjusting the turbine to decrease the exhaust gas flow through the turbine when the turbine is a VNT. Steps 305-309 may be implemented at overlapping time intervals in some embodiments.

At 310 the method includes determining if the engine is below the threshold temperature. If it is determined that the engine is below the threshold temperature (YES at 310) the method returns to 310. However, if it is determined that the engine is not below the threshold temperature (NO at 310) the method includes at 312 decreasing the flowrate of the exhaust gas directed from the EGR cooler to the surrounding atmosphere through the connecting line. In some embodiments, the flowrate of the exhaust gas from the EGR cooler to the surrounding atmosphere through the connecting line may be substantially inhibited.

It will be appreciated that the configurations and/or approaches described herein are exemplary in nature, and that these specific examples or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for operating an exhaust-gas recirculation (EGR) system comprising:
   during an engine warm-up:
      transferring heat from an exhaust flow drawn upstream of a variable nozzle turbine (VNT) through an EGR cooler to an engine coolant;
      directing a controlled portion of the exhaust flow from the EGR cooler to an engine intake; and
      directing another controlled portion of the exhaust flow from the EGR cooler to the exhaust downstream of the VNT through a control element and then to a surrounding atmosphere; while
   actuating the VNT to decrease exhaust gas flow through the turbine.

2. The method of claim 1, wherein the steps of transferring heat from an exhaust flow through an EGR cooler to an engine coolant, directing a controlled portion of the exhaust flow from the EGR cooler to an engine intake, and directing another controlled portion of the exhaust flow from the EGR cooler to the surrounding atmosphere are implemented when a temperature of an engine coupled to the high pressure EGR system is below a threshold temperature.

3. The method of claim 2, further comprising, when a temperature of an engine coupled to the high pressure EGR system is above a threshold temperature, decreasing a flowrate of the exhaust flow directed from the EGR cooler to the surrounding atmosphere.

4. The method of claim 1, wherein directing another controlled portion of the exhaust flow from the EGR cooler to the surrounding atmosphere includes directing a remainder of the exhaust flow through a connecting line fluidly coupled to an exhaust line downstream of the turbine.

5. The method of claim 4, wherein the connecting line is fluidly coupled to an exhaust line downstream of the turbine and upstream of an emission control device.

6. The method of claim 1, wherein the VNT is configured to adjust an aspect ratio of the turbine.

7. The method of claim 1, further comprising flowing the engine coolant to at least one of an engine cooling system and a cabin heating arrangement.

8. The method of claim 1, wherein the portion of exhaust directed to the engine intake and the portion of the exhaust flow directed to the surrounding atmosphere comprise a total exhaust gas flow from the engine.

9. The method of claim 1, wherein the steps of transferring heat from an exhaust flow, directing a portion of the exhaust flow, and directing another portion of the exhaust flow are implemented at overlapping time intervals.

10. The method of claim 1, further comprising substantially inhibiting exhaust gas flow from the EGR cooler to the inlet side of the engine when a temperature of an engine coupled to the high pressure EGR system is below a threshold temperature.

11. A method for controlling a high-pressure exhaust-gas recirculation (EGR) system in an internal combustion engine, the high-pressure EGR system including an EGR line branching off from an exhaust line upstream of a turbine, the EGR line and an EGR valve arranged upstream of an EGR cooler, the EGR line fluidly coupled to an inlet side of the internal combustion engine, the method comprising:

determining if the internal combustion engine is in a warm-up phase;

if the internal combustion engine is in a warm-up phase, actuating the EGR valve to generate an exhaust-gas flow through the EGR line, actuating a control element, the control element being arranged in a connecting line branching off from the EGR line downstream of the EGR cooler and opening out in the exhaust line downstream of the turbine, to flow exhaust gases from the EGR cooler into the exhaust line downstream of the turbine via the connecting line, and transferring a cooling medium in the EGR cooler heated by the exhaust gases in the EGR cooler, to a cooling system of the internal combustion engine; and during at least a portion of the warm-up phase, actuating the control element to flow a substantially majority of the exhaust gas from the EGR cooler to the connecting line and exhaust line downstream of the turbine, wherein the turbine is a variable nozzle turbine (VNT) configured to adjust an aspect ratio of the turbine, the method further comprising actuating the VNT to adjust the aspect ratio of the turbine when the EGR valve generates an exhaust-gas flow through the EGR line during the warm-up phase.

12. The method of claim 11, further comprising increasing an EGR rate to the inlet side through the EGR line via the EGR valve and the control element when it is determined that the warm-up phase of the internal combustion engine has ended.

13. The method of claim 11, wherein the EGR valve and the control element are each configured to be independently actuated and are each continuously adjustable.

* * * * *